(12) United States Patent  
Asano

(10) Patent No.: US 8,587,958 B2
(45) Date of Patent: Nov. 19, 2013

(54) WALL HANGER AND DISPLAY

(75) Inventor: Takashi Asano, Fukaya (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/431,752

(22) Filed: Mar. 27, 2012

(65) Prior Publication Data

US 2013/0016490 A1 Jan. 17, 2013

(30) Foreign Application Priority Data

Jul. 11, 2011 (JP) .................................. 2011-153288

(51) Int. Cl.
H05K 7/00 (2006.01)

(52) U.S. Cl.
USPC ...................................... 361/807; 248/231.91

(58) Field of Classification Search
USPC ................ 361/679.01, 807–810; 248/222.14, 248/231.91, 229.1, 457.1, 224.7–224.8
See application file for complete search history.

(56) References Cited

U.S. PATENT DOCUMENTS

| | | | |
|---|---|---|---|
| 2001/0019377 A1 | 9/2001 | Fukayama et al. | |
| 2010/0243832 A1* | 9/2010 | Hsu et al. | 248/205.3 |
| 2011/0141671 A1* | 6/2011 | Ishizu et al. | 361/679.01 |

FOREIGN PATENT DOCUMENTS

| | | | |
|---|---|---|---|
| JP | 6-1123573 | 8/1986 | |
| JP | 61-149380 | 9/1986 | |
| JP | 03-272199 | 12/1991 | |
| JP | 5-17211 | 3/1993 | |
| JP | 07-243415 | 9/1995 | |
| JP | 2000-069617 | 3/2000 | |
| JP | 2001-249324 | 9/2001 | |
| JP | 2003-028113 | 1/2003 | |
| JP | 2011-077114 | 4/2011 | |
| TW | M397115U1 | * 1/2011 | ............... 248/222.14 |

* cited by examiner

Primary Examiner — Tuan T Dinh
Assistant Examiner — Mukund G Patel
(74) Attorney, Agent, or Firm — Blakely, Sokoloff, Taylor & Zafman LLP

(57) ABSTRACT

According to one embodiment, a display is provided with a rib structure on the inner surface of rear-side casing, and a fixing tool to be fitted with the rib structure. The rib structure includes a push plate configured to push the fixing tool toward the inner surface of the casing, and the fixing tool includes a projection configured to come into contact with the push plate. The position where the push plate pushes the projection is horizontally aligned with the position where the fixing tool is fastened and fixed using an attachment hole of the casing.

8 Claims, 5 Drawing Sheets

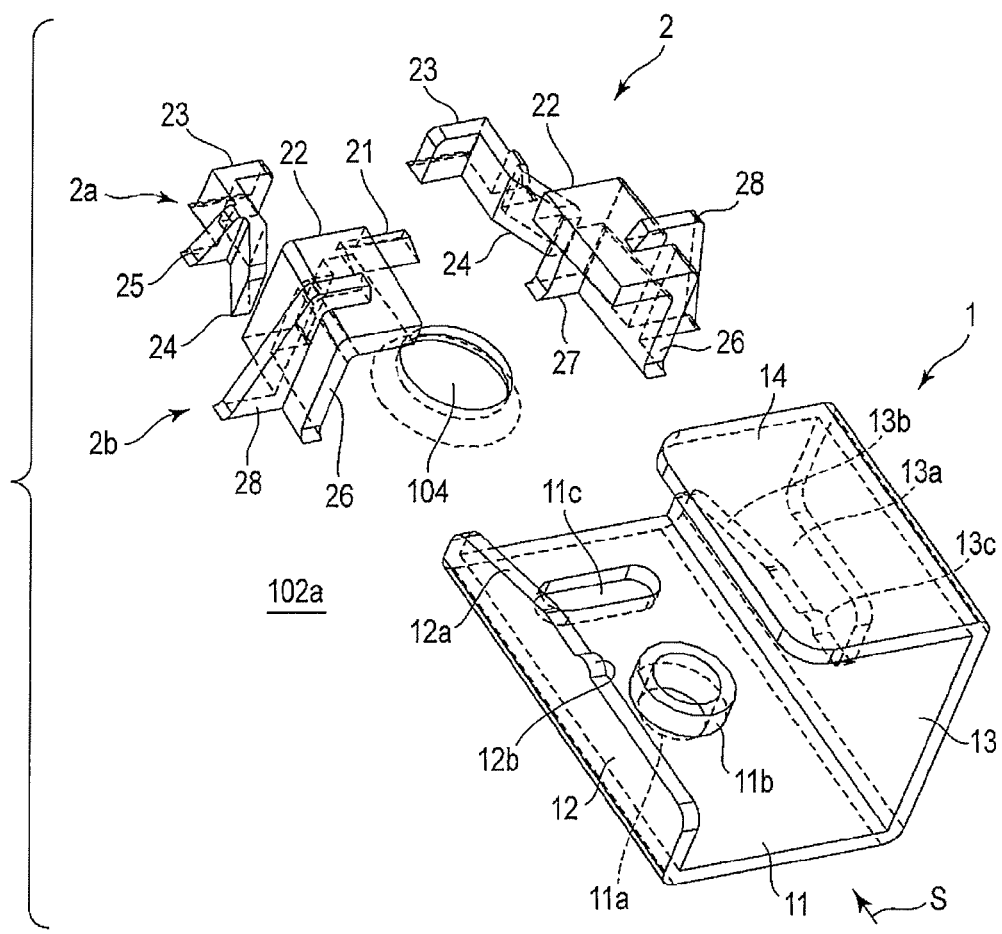
F I G. 4

WALL HANGER AND DISPLAY

CROSS-REFERENCE TO RELATED APPLICATIONS

This application is based upon and claims the benefit of priority from prior Japanese Patent Application No. 2011-153288, filed Jul. 11, 2011, the entire contents of which are incorporated herein by reference.

FIELD

Embodiments described herein relate generally to a wall hanger configured to hand an electronic apparatus, e.g., a display, on a wall, and to a display.

BACKGROUND

Along with the recent wide use of a comparative large-sized display, there is an increasing demand for a wall-hung display in order to make the installation space as small as possible.

In general, a display comprises a resin casing regardless of the size of the display. Normally, the larger the size of a display is, the heavier the display is. Therefore, in order to design the resin casing to be a wall-hung type, a wall hanger must have a high rigidity.

Although a large wall hanger may be mechanically strong, such a wall hanger inevitably has an increased weight.

Under the circumstances, there is a demand for a wall hanger which can be manufactured at low cost, has a sufficient mechanical strength and is light in weight.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is a perspective view showing a state where a fixing tool of the assembling structure depicted in FIG. 3 is separated from a rib structure.

DETAILED DESCRIPTION

In general, according to one embodiment, a rib structure on an inner surface of a rear-side casing; and a fixing tool fitted into the rib structure. The rib structure comprises a push plate configured to push the fixing tool toward the inner surface of the casing, and the fixing tool comprises a projection configured to come into contact with the push plate. The position where the push plate pushes the projection is horizontally aligned with the position where the fixing tool is fastened and fixed using attachment holes of the casing.

Various embodiments will be described hereinafter with reference to the accompanying drawings.

Figure 1:
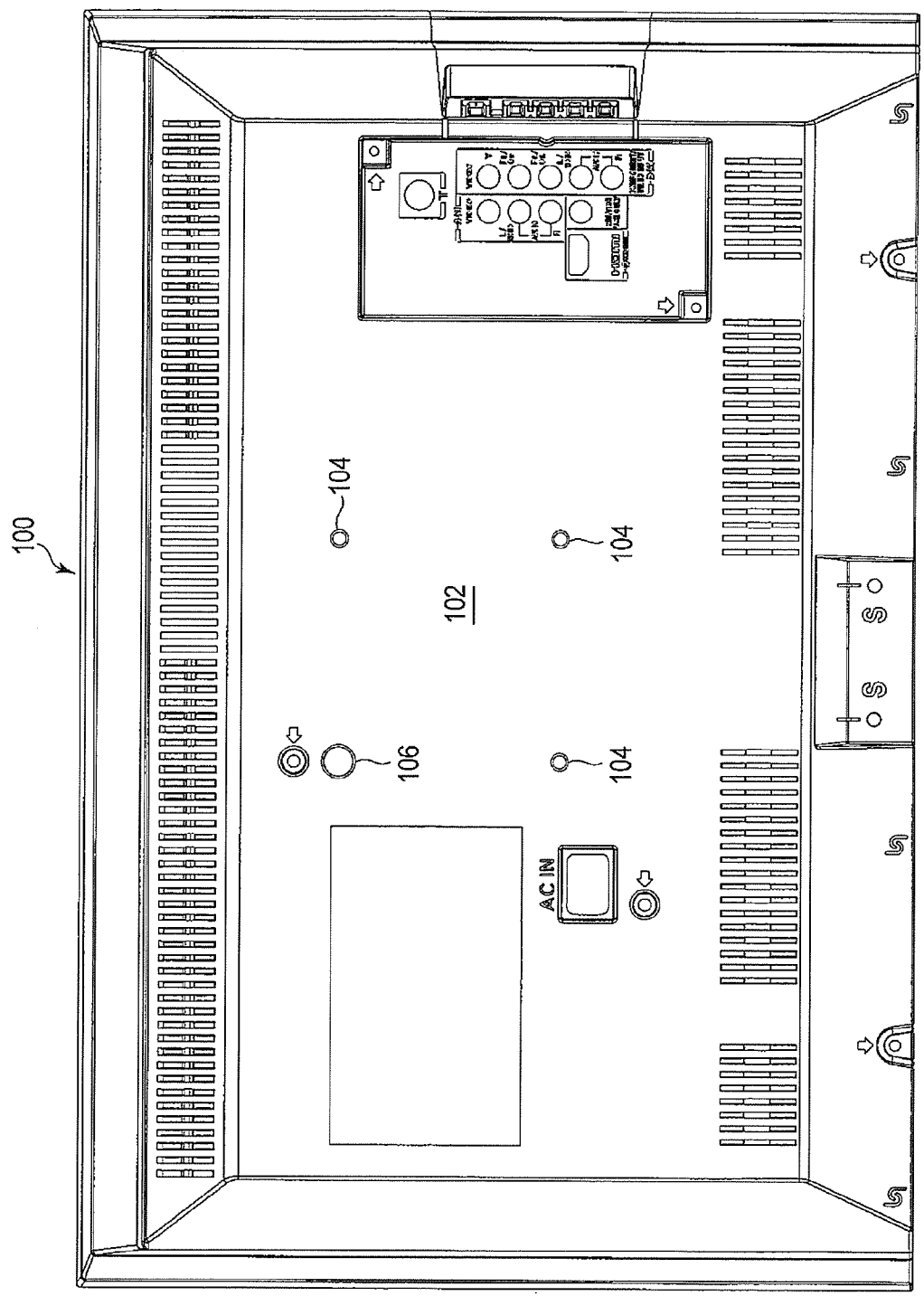
FIG. 1 is a schematic view showing the rear side of a display that is hung on a wall by means of a wall hanger according to an embodiment.

FIG. 1 is a schematic view showing the rear side of a display 100 that is hung on a wall by means of a wall hanger according to an embodiment (the rear side of the display is a side facing the wall).

The display 100 comprises a metallic chassis (not shown) inside a resin casing 102, and a liquid crystal display panel (not shown), circuit boards of various kinds (not shown), etc. are attached to the metallic chassis. In other words, the resin casing 102 of the display 100 covers the chassis to which a variety of electronic apparatuses are attached.

To hang this type of display 100 on a wall, a wall plate (not shown), an attachment tool (not shown) configured to hang the display 100 on the wall plate, and a fixing tool (described later) configured to fix the fixing tool to the rear-side casing (i.e., the back cover) of the display 100, are required.

A rib structure 2 (described later) for securing the fixing tool 1 to the inner surface of the casing 102 is projected from the rear-side casing 102 of the display 100. In other words, the fixing tool 1 fixes the attachment tool to the rear-side casing 102, with the rear-side casing 102 of the display 100 being located between the fixing tool 1 and the attachment tool.

The wall plate, the attachment tool, the fixing tool 1 and the rib structure 2 jointly function as a wall hanger according to the subject embodiment. In the description below, the combination of the fixing tool 1 with the rib structure 2, which constitutes part of the wall hanger, will be referred to as an assembling structure 10. The configuration and function of the assembling structure 10 will be described later.

The casing 102 is provided with three attachment holes 104 for permitting an attachment tool (not shown) to be attached to the rear side of the display 100, in cooperation with the assembling structure 10. The casing 102 is also provided with screw holes 106 for permitting the attachment tool to be screwed and fixed to the chassis (not shown). The assembling structure 10, which constitutes part of the wall hanger of the embodiment and is made up of the fixing tool 1 and the rib structure 2, is provided at positions corresponding to the three attachment holes 104 and is located on the inner surface of the rear-side casing 102 of the display 100.

To hang the display 100 on a wall, a wall plate (not shown) is first fixed to the wall on which the display 100 is to be hung. The fixing tool 1 is attached to each of three rib structures 2 on the inner surface of the rear-side casing 102, thus obtaining three assembling structures. The three assembling structures 10 are provided at positions corresponding to the above-mentioned three attachment holes 104 of the casing 102.

Then, attachment tools (not shown) are arranged on the outside of the casing 102 in such a manner that they cover the three attachment holes 104. The attachment tools are secured to the three assembling structures 10 by inserting screws into the three attachment holes 104 from outside the attachment tools. In addition, the attachment tools are secured directly to the chassis (not shown) by inserting screws (not shown) into the screw holes 106 of the casing 102. In this manner, the attachment tools are attached to the rear-side casing 102.

Finally, the attachment tools fixed to the rear-side casing 102 are engaged with the wall plate fixed to the wall, thereby hanging the display on the wall. When the display 100 is hung on the wall, the wall hanger described above serves to support the overall weight of the display 100.

Figure 2:
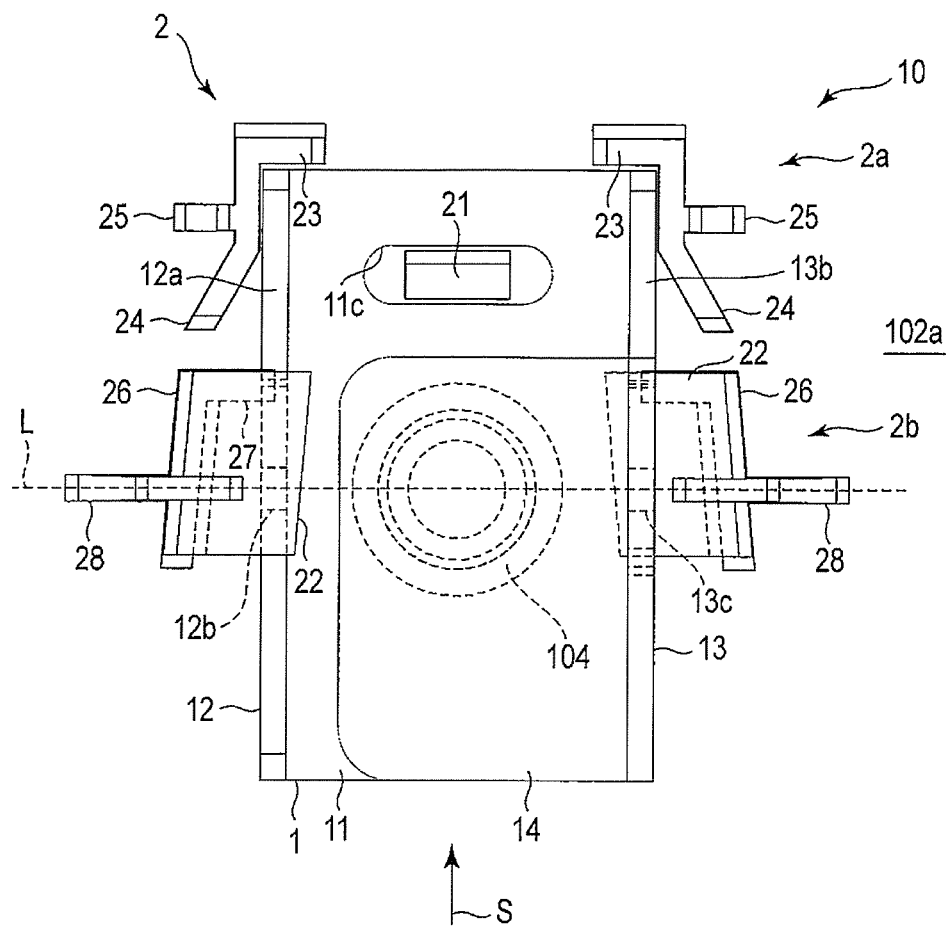
FIG. 2 is a plan view showing an assembling structure which is part of the wall hanger of the embodiment and provided on the rear side of the casing of the display.
Figure 3:
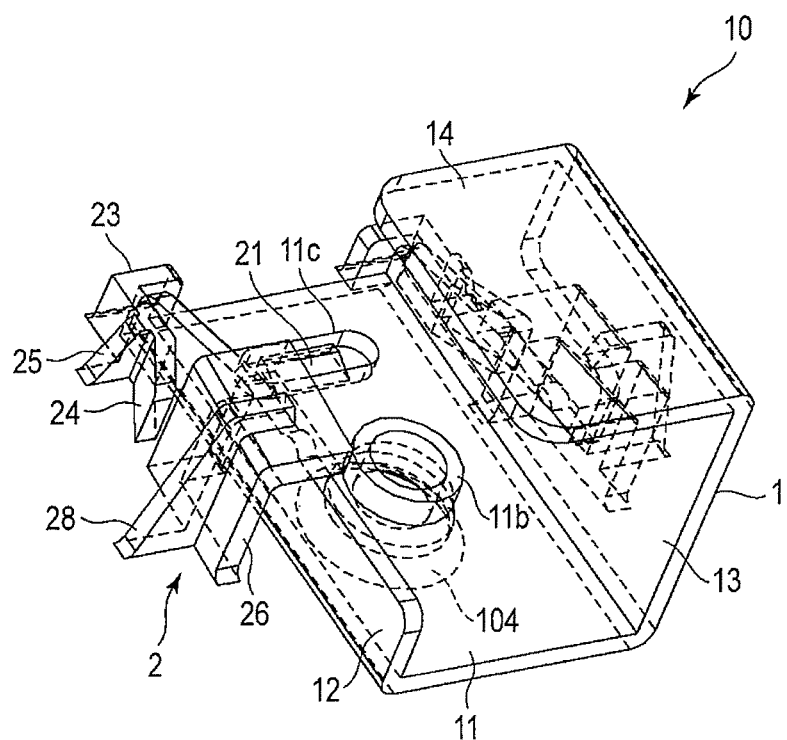
FIG. 3 is a perspective view of the assembling structure shown in FIG. 2.
Figure 5:
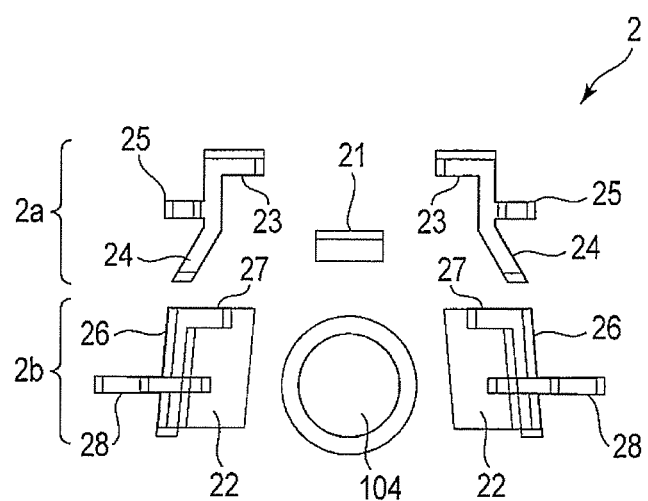
FIG. 5 is a plan view of the rib structure.

An assembling structure 10, which is a structural element of a wall hanger according to an embodiment, will be described with reference to FIGS. 2 through 5. FIG. 2 is a plan view showing how the assembling structure 10 looks like when viewed from the inner surface 102a of the casing 102. FIG. 3 is a perspective view of the assembling structure. FIG. 4 is a perspective view showing a state where the fixing tool 1 is separated from the rib structure 2 of the assembling structure 10. FIG. 5 is a plan view showing how the rib structure 2 looks like when viewed from the inner surface 102a of the casing 102.

The fixing tool 1 is formed by working one plated sheet steel to have the depicted shape and bending the sheet steel a number of times. The rib structure 2 permits the fixing tool 1 to be fixed to the inner surface of the rear-side casing 102 of the display 100 without using screws or the like. The rib structure 2 is integrally projected from the inner surface of the resin casing 102.

The fixing tool 1 comprises: a rectangular bottom plate 11 whose outer surface is in contact with the outer surface 102a of the casing 102; two raised plates 12 and 13 which are continuous with the side edges extending in the longitudinal direction of the rectangular bottom plate 11 and bent at right angles in a direction away from the inner surface 102a; and a protective plate 14 which is continuous with the upper edge of the taller one of the two raised plates 12 and 13 (the upper edge is an edge that is depicted as being upper in the drawings) and is substantially parallel to the bottom plate 11. One (13) of the raised plates is taller than the other (12).

The fixing tool 1 is assembled with the rib structure 2 by sliding the fixing tool 1 in the longitudinal direction (i.e., the direction of arrow S in FIG. 4) in the state where the outer surface of the bottom plate 11 is in contact with the inner surface 102a. The fitting direction of the fixing tool 11, namely, the direction of arrow S, is the same as the vertically upward direction and along the rear surface of the display 100.

The fixing tool 1 is assembled with the rib structure 2 in such a manner that the taller one (13) of the two raised plates 12 and 13 is located closer to a power supply board (not shown). Since the taller raised plate 13 is arranged on the side of the power supply board, a pin inserted into the attachment hole 104 from the outside, or another foreign object, does not come into contact with the power supply board.

The bottom plate 11 of the fixing tool 1 has a hole 11a (not shown) through which a screw (not shown) is inserted into the attachment hole 104 from the rear surface of the casing 102, i.e., from the outside of the casing 102. A nut 11b, which is threadably engageable with the screw, is fixed to the inner surface of the bottom plate 11 by welding or the like at a position corresponding to the hole lie. The bottom plate 11 also has an elongated latch hole 11c which receives and engageable with a latch claw 21 (described later) of the rib structure 2 projected from the inner surface 102a of the casing 102.

The lower one (12) of the two raised plates 12 and 13 has a tapered portion 12a at the upper edge away from the bottom plate 11. The tapered portion 12a is located at the leading end of the fixing tool 1, as defined in the sliding direction (i.e., the direction of arrow S in FIG. 4), when it is fitted with the rib structure 2. The tapered portion 12a is tapered toward the leading end, as defined in the sliding direction, and slanted in a direction approaching the inner surface 102a of the casing 102 (i.e., in the downward direction in the drawings). The tapered portion 12a enables easy fitting of the fixing tool 1.

A projection 12b, which comes into point contact with the inner surface of the push plate 22 (described later) of the rib structure 2, is provided near the center of the upper edge of raised plate 12. The projection 12b is projected from the upper edge of the raised plate 12 and having an arcuate section. The projection 12b is configured to come into contact with the inner surface of the planar push plate 22 with a small contact area. The projected height of the projection 12b is determined in such a manner that the push plate 22 holds the fixing tool 1 with a certain force when the fixing tool 1 is fitted with the rib structure 2.

The taller one (13) of the two raised plates 12 and 13 has a slit 13a which allows insertion and passage of the other push plate 22 of the rib structure 22. The lower edge of the slit 13a has the same shape as the upper edge of the raised plate 12 and functions likewise. That is, the lower edge of the slit 13a is provided with a tapered portion 13b and a projection 13c.

This projection 13c and the projection 12b of the other raised plate 12 are on line L (indicated by the broken lines in FIG. 2), which is perpendicular not only to the axis of screws used for fastening the fitting tool 1 to the casing 102 but also to the longitudinal direction S. In other words, the position where the fixing tool 1 is fastened and fixed to the casing 102, the position where the projection 12b is in contact with the inner surface of the push plate 22 of the rib structure 2, and the position where the projection 13c is in contact with the inner surface of the other push plate 22, are (horizontally) located on line L.

The protective plate 14, which is continuous with the raised plate 13 and substantially parallel to the bottom plate 11, extends at least to the position corresponding to the axis of the screw used for fastening and fixing the fixing tool 1 to the casing 102. In other words, the protective plate 14 covers the tip end of the screw (not shown) used for securing the fixing tool 1, and functions to protect an electronic apparatus arranged inside the casing 102 by preventing the tip end of the screw from touching the electronic apparatus. The protective plate 14 also functions as a knob which the operator holds when assembling the fixing tool 1 with the rib structure 2.

The rib structure 2 integrally projected from the inner surface 102a of the casing 102 is (bilaterally) symmetric with respect to the central axis (not shown) extending in the fitting direction S of the fixing tool 1. The rib structure 2 comprises upper portions 2a configured to receive the leading end of the fixing tool 1, as defined in the fitting direction, and lower portions 2b configured to press the projection 12b of the raised plate 12 of the fixing tool 1 and the projection 13c of the raised plate 13 toward the inner surface 102a of the casing 102. In other words, the rib structure 2 is made up of four projections projected from the inner surface 102a of the casing 102.

As shown, for example, in FIG. 2, the upper portions 2a comprise L-shaped engagement portions 23 with which angular portions at the upper end of the fixing tool 1 are brought into contact. The two engagement portions 23 receive the angular portions at the upper end of the fixing tool 1, which is fitted from below, and thus function as support portions configured to support the weight of the casing 102.

The two upper portions 2a described above comprise tapered portions 24 for easy fitting of the fixing tool 1. The tapered portions 24 are continuous with the lower end of the engagement portions 23 and slanted vertically downward. If the leading end of the fixing tool 1 is fitted slantwise with reference to the rib structure 2, the two tapered portions 24 function to guide the angular portions at the leading end of the fixing tool 1 toward the engagement portions 23.

The L-shaped engagement portion 23 and the tapered portion 24 of each of the upper portions have a shape obtained by bending one long and thin plate and are projected from the inner surface 102a of the casing 102 by a height which is substantially equal to the height of the tip ends of the raised plates 12 and 13 of the fixing tool 1, namely, the height of the tip ends of the tapered portions.

To ensure desired sufficient mechanical strength, the two upper portions 2a described above may be made of comparatively thick plates. If the projections are thick, however, the resin may shrink during the manufacturing process, and a sink may be formed in the rear surface of the casing, i.e., in the outer surface of the casing. For this reason, the present embodiment does not employ thick plate portions to prevent the shrinkage, and the plate portions are provided with ribs 25 on the outer sides, for reinforcement.

On the other hand, the right and left lower portions 2b are provided with raised walls 26 at positions shifted from the fitting tool 1 and projected from the inner surface 102a of the casing 102. The push plates 22 described above extend toward each other from the upper edges of the raised walls 26 (the edges depicted as being upper in the drawings). As can be understood from this, each of the right and left lower portions 2b is provide with portions 26 and 22 obtained by bending one plate to have an "L" shape. The projected height of the right and left raised walls 26 from the inner surface 102a of the casing 102 is determined in relation to the heights of the raised plates 12 and 13 and is greater than the projected height of the upper portions 2a.

Support portions 27 are integrally provided on the vertically upper edge of the two raised walls 26 in order to reinforce the raised walls 26 and the push plates 22. In other words, the support portions 27 are integrally formed with the raised walls 26 and the push plates 22. The inner surfaces of the right and left support portions 27, which are raised from the inner surface 102a of the casing 102 and facing each other, serve as guide surfaces configured to guide the side surfaces of the fitting tool 1.

L-shaped ribs 28 are integrally provided on the lower portions of the outside walls of the continuous L-shaped portions made by the raised walls 26 and push plates 22 continuous with the raised walls 26. The right and left ribs 28 are arranged on line L shown in FIG. 2. The two ribs 28 are provided to prevent the above-mentioned resin shrinkage and formation of a sink in the manufacturing process. In other words, the right and left ribs 28 are located at contact positions with the projections 12b and 13c and are horizontally aligned with the position where the fixing tool 1 is fastened and secured.

A description will now be given as to how the fixing tool 1 having the above structure is fitted with the rib structure 2 described above.

To fit the fixing tool 1 with the rib structure 2, the operator holds the protective plate 14 of the fixing tool 1, and slides the fitting tool 1 from the lower portion 2b of the rib structure 2 upward, while simultaneously permitting the bottom plate 11 to be in contact with the inner surface 102a of the casing 102. The leading end of the fixing tool 1, as defined in the fitting direction, namely, the vertically upper end of the fixing tool 1, passes through the region between the right and left lower portions 2b and is guided along the inner side surfaces of the support portions 27. Subsequently, the angular portions of the upper end of the fitting tool 1 pass through the region between the tapered portions 24.

If the fixing tool 1 is not exactly inserted in the fitting direction (i.e., the direction indicated by arrow S) but in a slantwise direction, the two tapered portions 24 serve to receive the angular portions at the upper end of the fixing tool 1 and thus guide the fixing tool 1 toward the engagement portions 23. When the fixing tool 1 is inserted straight, the angular portions of the fixing tool 1 do not come into contact with the tapered portions 24.

After being guided by the two tapered portions 24 or passing through the region between the two tapered portions 24, the angular portions of the upper end of the fitting tool 1 come into contact with the inner sides of the right and left L-shaped engagement portions 23 and are stopped thereby. In this state, the hole 11a formed in the bottom plate 11 of the fixing tool 1 is coaxial with the attachment hole 104 of the casing 102.

Simultaneous with this, the latch claw 21 projected from the inner surface 102a of the casing 102 engages with the latch hole 11c of the bottom plate 11 of the fixing tool 1. In addition, the projections 12b and 13c projected from the right and left raised plates 12 and 13 of the fixing tool 1 are pressed by the right and left push plates 22, thus preventing the fixing tool 1 from disengaging.

In this state, a screw (not shown) is inserted into the attachment hole 104 from the rear-surface side of the casing 102, i.e., from the outside of the casing 102. In this manner, the attachment tool can be fixed to the rear surface of the casing 102. In other words, the fixing tool 1 does not have to be held by the operator, and the operation of attaching the attachment tool is easy to perform.

The advantages described below are obtained by using the above-described assembling structure 10 as a wall hanger of the display 100.

In the present embodiment, the positions at which the projections 12b and 13c of the fixing tool 1 come into contact with the right and left push plates 22 of the rib structure 2 are on straight line L passing through the axis of a screw used for fastening the fixing tool 1 to the rear-side casing 102. In addition, the right and left reinforcing ribs 28 of the rib structure 2 are on the same straight line L. With this structure, the force acting on the assembling structure 10 can be concentrated on straight line L, and undesired torsional stress is not generated.

Therefore, when the screw (not shown) is inserted into the attachment hole 104 and the hole 11a of the fixing tool 1 fitted with the rib structure 2 from the rear-surface side of the casing 102, and the nut 11b is brought into threadable engagement with that screw, the fixing tool 1 is prevented from being undesirably rotated. Accordingly, the tightening operation is easy to perform.

In the present embodiment, the rib structure 2 with which the fixing tool 1 is assembled is made up of separate portions, namely, the upper portions 2a and lower portions 2b. With this structure, the stress exerted on the assembling structure 10 is distributed, and the rib structure 2 is prevented from being damaged. In particular, the projected height of the upper portions 2a and the projected height of the lower portions 2b differ from each other, and the force exerted on the upper portions 2a and the force exerted on the lower portions differ in vector. Thus, the concentration of the stress can be prevented effectively.

Furthermore, in the present embodiment, the fixing tool 1 and the rib structure 2 have sufficient mechanical strength and yet they are simple. The amount of material required can be reduced, and the manufacturing cost of the subject wall hanger can be lowered, accordingly.

The wall hanger of the embodiment comprises the assembling structure 10 having the above-mentioned constitution. Thanks to this, the wall hanger can be manufactured at low cost, has sufficient mechanical strength, and is light in weight.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the above-described embodiment was explained referring to the wall hanger for a display, but the wall hanger is in no way limited to this. It may be applied to a wall hanger for other types of electronic apparatuses, such as a comparatively heavy speaker. Furthermore, although the embodiment was described, referring to the rib structure made up of the upper portions 2a and the lower portions 2b, this rib structure is in no way restrictive. That is, the upper portions 2a and the lower portions 2b may be integral with each other.

What is claimed is:

1. A display comprising:
a rear-side casing:
a rib structure on an inner surface of the rear-side casing; and
a fixing tool to be fitted with the rib structure,
wherein the rib structure comprises a push plate that pushes the fixing tool toward the inner surface,
the fixing tool comprises a projection that comes into contact with the push plate and pushes back the push plate, a tapered portion slanted toward a leading end of the fixing tool, as defined in a fitting direction, and two raised plates on sides as defined in the fitting direction, one of the raised plates located closer to a power supply board being taller than the other of the raised plates;
wherein a position at which the push plate pushes the projection is horizontally aligned with a position where the fixing tool is fixed using an attachment hole of the rear-side casing.

2. The display of claim 1, further comprising:
a latch claw on the inner surface of the rear-side casing; and
a latch hole in the fixing tool and that engages the latch claw.

3. A display comprising:
a rear-side casing:
a rib structure on an inner surface of the rear-side casing; and
a fixing tool to be fitted with the rib structure;
wherein the rib structure comprises:
an upper portion comprising an engagement portion that engages a vertically upper end of the fixing tool; and
a lower portion comprising a push plate that pushes the fixing tool toward the inner surface, the lower portion being separate from the upper portion and located vertically downward;
wherein a position at which the push plate pushes the fixing tool toward the inner surface is horizontally aligned with a position where the fixing tool is fixed using an attachment hole of the rear-side casing.

4. The display of claim 3, wherein the lower portion comprises a rib for reinforcement.

5. A wall hanger comprising:
a rib structure on an inner surface of a rear-side casing of an electronic apparatus; and a fixing tool to be fitted with the rib structure,
wherein the rib structure comprises a push plate that pushes the fixing tool toward the inner surface,
the fixing tool comprises a projection that comes into contact with the push plate and pushes back the push plate, a tapered portion slanted toward a leading end of the fixing tool, as defined in a fitting direction, and two raised plates on sides as defined in the fitting direction, one of the raised plates located closer to a power supply board being taller than the other of the raised plates;
wherein a position at which the push plate pushes the projection is horizontally aligned with a position where the fixing tool is fixed using an attachment hole of the rear-side casing.

6. The wall hanger of claim 5, further comprising:
a latch claw on the inner surface of the rear-side casing; and
a latch hole in the fixing tool and that engages the latch claw.

7. A wall hanger comprising:
a rib structure on an inner surface of a rear-side casing of an electronic apparatus; and a fixing tool to be fitted with the rib structure;
wherein the rib structure comprises:
an upper portion comprising an engagement portion that engages a vertically upper end of the fixing tool; and
a lower portion comprising a push plate that pushes the fixing tool toward the inner surface, the lower portion being separate from the upper portion and located vertically downward;
wherein a position at which the push plate pushes the fixing tool toward the inner surface is horizontally aligned with a position where the fixing tool is fixed using an attachment hole of the rear-side casing.

8. The wall hanger of claim 7, wherein the lower portion comprises a rib for enforcement.

* * * * *